US012651904B2

(12) United States Patent
Chen et al.

(10) Patent No.: US 12,651,904 B2
(45) Date of Patent: Jun. 9, 2026

(54) DEEP LEARNING-BASED APPROACH FOR SOLVING OPTIMAL POWER FLOW PROBLEMS WITH FLEXIBLE TOPOLOGY

(71) Applicant: City University of Hong Kong, Hong Kong (CN)

(72) Inventors: Minghua Chen, Hong Kong (CN); Min Zhou, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 447 days.

(21) Appl. No.: 18/346,923

(22) Filed: Jul. 5, 2023

(65) Prior Publication Data

US 2025/0015593 A1 Jan. 9, 2025

(51) Int. Cl.
*H02J 3/16* (2026.01)
*H02J 103/30* (2026.01)
*H02J 103/35* (2026.01)

(52) U.S. Cl.
CPC ............. *H02J 3/16* (2013.01); *H02J 2103/30* (2026.01); *H02J 2103/35* (2026.01)

(58) Field of Classification Search
CPC ....... H02J 3/16; H02J 2203/20; H02J 2203/10
USPC ......................................... 700/286
See application file for complete search history.

(56) References Cited

U.S. PATENT DOCUMENTS

| | | | | |
|---|---|---|---|---|
| 8,315,742 B2 * | 11/2012 | Patel | .......................... | H02P 9/10 |
| | | | | 700/297 |
| 11,436,494 B1 * | 9/2022 | Huang | ...................... | H02J 3/00 |

| | | | | |
|---|---|---|---|---|
| 2013/0238148 A1 * | 9/2013 | Legbedji | ................... | H02J 3/14 |
| | | | | 700/286 |
| 2013/0268131 A1 * | 10/2013 | Venayagamoorthy | .... | G05F 5/00 |
| | | | | 700/286 |
| 2016/0048150 A1 * | 2/2016 | Chiang | ..................... | G05F 1/66 |
| | | | | 700/295 |
| 2020/0184308 A1 * | 6/2020 | Li | .......................... | H02J 3/001 |
| 2024/0291274 A1 * | 8/2024 | Hedman | .................. | H02J 3/16 |

OTHER PUBLICATIONS

X. Pan, M. Chen, T. Zhao, and S. H. Low, "DeepOPF: A Feasibility-Optimized Deep Neural Network Approach for AC Optimal Power Flow Problems", arXiv preprint arXiv:2007.01002, 2020.

(Continued)

*Primary Examiner* — Md Azad
(74) *Attorney, Agent, or Firm* — S&F/WEHRW

(57) ABSTRACT

A method for solving multiple OPF equations of an AC electrical power system with plural topologies and admittances is provided. The method includes determining a continuous admittance space to embed the plural topologies, determining a plurality of voltage magnitudes and a plurality of voltage phase angles of the plurality of buses by a deep neural network, and reconstructing an active power generation and a reactive power generation using power flow equations according to the plurality of voltage magnitudes, the plurality of voltage phase angles, and the load inputs. The continuous admittance space is an admittance matrix of a plurality of line admittances each having a default admittance computed using a conductance and a susceptance of the plurality of branches. The deep neural network receives the load inputs and the plurality of line admittances as inputs.

9 Claims, 3 Drawing Sheets

(56) References Cited

OTHER PUBLICATIONS

M. Chatzos, F. Fioretto, T. W.K. Mak, P. V. Hentenryck, "High-Fidelity Machine Learning Approximations of Large-Scale Optimal Power Flow", arXiv preprint arXiv:2006.1635, 2020.

A. Zamzam and K. Baker, "Learning Optimal Solutions for Extremely Fast AC Optimal Power Flow", in Proceedings of the 11th IEEE International Conference on Communications, Control, and Computing Technologies for Smart Grids (IEEE SmartGridComm 2020), virtual conference, Nov. 11-13, 2020.

D. Owerko, F. Gama, and A. Ribeiro, "Optimal Power Flow Using Graph Neural Networks", IEEE International Conference on Acoustics, Speech and Signal Processing (ICASSP). IEEE, 2020: 5930-5934.

F. Fioretto, T. Mak and P. V. Hentenryck, "Predicting AC Optimal Power Flows: Combining Deep Learning and Lagrangian Dual Methods", Proceedings of the AAAI Conference on Artificial Intelligence. 2020, 34(01): 630-637.

G. Neel, Z. Wang and A. Majumdar, "Machine Learning for AC Optimal Power Flow", In Proceedings of the 36th International Conference on Machine Learning Workshop, Long Beach, CA, USA, Jun. 10-15, 2019.

S. Park, W. Chen, T. W. Mak, and V. P. Hentenryck, "Compact Optimization Learning for AC Optimal Power Flow", arXiv preprint arXiv:2301.08840, 2023.

X. Lei., J. Yu, H. Aini, and W. Wu, "Data-driven alternating current optimal power flow: A Lagrange multiplier based approach", Energy Reports, vol. 8, pp. 748-755, Nov. 2022.

* cited by examiner

DEEP LEARNING-BASED APPROACH FOR SOLVING OPTIMAL POWER FLOW PROBLEMS WITH FLEXIBLE TOPOLOGY

PRIOR DISCLOSURE BY THE INVENTOR OR A JOINT INVENTOR

Part of the present invention was disclosed in a paper published in IEEE Transactions on Power Systems vol. 38 [1] on 7 Nov. 2022. The paper is a grace period inventor-originated disclosure disclosed within one year before the effective filing date of this application.

FIELD OF THE INVENTION

The present disclosure generally relates to the field of power system optimization. In particular, the present disclosure relates to a deep learning-based approach for solving the optimal power flow (OPF) problem with flexible topology and line admittance, without the need for retraining the deep neural network (DNN) model.

BACKGROUND OF THE INVENTION

In recent years, machine learning techniques, particularly deep neural networks (DNNs), have gained significant attention for their ability to solve complex problems efficiently. One such application is the optimal power flow (OPF) problem, which is a key challenge in the operation and planning of electric power networks. The OPF problem is a non-convex optimization problem that seeks to minimize the total cost of power generation. Therefore, it is desirable to determine the optimal operating point of a power system while adhering to various operational constraints.

Traditional iterative solvers for the OPF problem can be computationally intensive and time-consuming. As a result, there has been growing interest in employing DNNs to directly solve OPF problems, leveraging their approximation capabilities to learn the load-solution mapping [2]. Several studies have demonstrated that DNNs can generate high-quality solutions for various OPF formulations with significant speedup compared to the conventional iterative solvers. The Applicant has previously filed a patent, under the Publication No. US 2023/0085739 A1 [3], for a method using DNNs to solve the OPF problem over one specific system, which is hereby incorporated by reference in its entirety.

However, a key limitation of existing DNN-based OPF methods is that the trained DNN is only applicable to solving OPF problems over a specific system topology and line admittance. When either the topology or admittances change, the DNN must be retrained to learn a new load-solution mapping. This process of retraining DNNs in real-time [4] or pre-training multiple DNNs offline for all possible combinations of topology and admittances is computationally expensive and may not be practical.

Furthermore, the growing integration of renewable energy sources, such as wind and solar power, into the U.S. power sector poses significant challenges due to uncertainties in power generation. Fast and efficient OPF calculations are crucial for managing these uncertainties, ensuring stable power system operation, and accommodating the increasing use of renewable energy.

Accordingly, there is a need for an approach to address the limitations of existing DNN-based methods for solving OPF problems in multiple alternating-current (AC) electrical power system. Furthermore, other desirable features and characteristics will become apparent from the subsequent detailed description and the appended claims, taken in conjunction with the accompanying drawings and this background of the disclosure.

SUMMARY OF THE INVENTION

Provided herein is a Deep OPF Flexible Topology as an embedded training approach, which enables the training of a single DNN to solve multiple AC optimal power flow (AC-OPF) problems in an AC electrical power system modeled with the same buses, generators, and line capacity configuration, but with different topologies and line admittances, without the necessity of retraining. This innovative method has the potential to greatly enhance the efficiency and practicality of using DNNs for OPF problem-solving in modern power systems.

In certain aspects of the present disclosure, a computer-implemented method for solving multiple OPF equations and a plurality of constraints of an AC electrical power system with plural topologies and admittances is provided. The AC electrical power system is modeled with a plurality of branches interconnecting a plurality of buses and generators each having a pre-determined line capacity. The plurality of buses is assigned with load inputs of a plurality of active loads $$p_i^d$$

and a plurality of reactive loads $$q_i^d$$

such that an individual bus is arranged to satisfy a respective active load and a respective reactive load. The method includes determining a continuous admittance space Y to embed the plural topologies, wherein the continuous admittance space Y is an admittance matrix of a plurality of line admittances $Y_{i,j}$ each having a default admittance computed using a conductance $b_{ij}$ and a susceptance $g_{ij}$ of the plurality of branches; determining a plurality of voltage magnitudes v and a plurality of voltage phase angles $\theta$ of the plurality of buses such that a complex-valued voltage observed at the individual bus is predicted, wherein the plurality of voltage magnitudes v and the plurality of voltage phase angles $\theta$ are computed by a DNN, and wherein the DNN receives the load inputs and the plurality of line admittances $Y_{i,j}$ as inputs; and reconstructing an active power generation $p^g$ and a reactive power generation $q^g$ using power flow equations according to the plurality of voltage magnitudes v, the plurality of voltage phase angles $\theta$, and the load inputs, whereby a plurality of required active power generations and a plurality of required reactive power generations for the plurality of buses are obtained.

In an embodiment, the method further includes the steps of training the DNN with training dataset before using the DNN to compute the plurality of voltage magnitudes v and the plurality of voltage phase angles $\theta$; and evaluating the DNN with testing dataset on performance metrics based on a flexible topology with fixed admittances scenario, and a flexible topology with flexible admittances scenario.

In an embodiment, the method further includes the steps of randomly sampling data points from a uniform distribution of a predetermined variation around a default load region; labeling the data points with labels and ground truth values of the plurality of voltage magnitudes v and the plurality of voltage phase angles θ; and splitting the data points into a first group of load inputs for the training dataset and a second group of load inputs for the testing dataset.

In an embodiment, the ground truth values are generated using a primal-dual interior-point method to solve an individual OPF problem of the multiple OPF equations for generating a close-to-optimal solution to the individual OPF equations.

In an embodiment, the method further includes the steps of randomly sampling training admittances from a uniform distribution of a predetermined variation around the default admittances, wherein the training admittances are sampled from a first region covering an on status of the plurality of branches and a second region covering an off status of the plurality of branches; and applying the training admittances as the training dataset.

In an embodiment, the flexible topology with fixed admittances scenario applies the default admittances for evaluating the DNN; and the flexible topology with flexible admittances scenario applies a flexible admittance for evaluating the DNN; and wherein the flexible admittance is randomly sampled from a uniform distribution of a predetermined variation around the default admittances for capturing a variation of the admittance in a real power system.

In an embodiment, the predetermined variation is 20% such that the flexible admittance is sampled between 80% to 120% of the default admittances.

In an embodiment, the plurality of required active power generations and the plurality of required reactive power generations for the plurality of buses are determined to minimize a total cost of power generation formulated by:

$$\min \sum_{i \in B} C(p_i^g).$$

In an embodiment, the method further includes that if the plurality of constraints is satisfied by the plurality of required active power generations and the plurality of required reactive power generations, using the plurality of required active power generations and the plurality of required reactive power generations as operating conditions.

In an embodiment, the method further includes that if the plurality of constraints is not satisfied by the plurality of required active power generations and the plurality of required reactive power generations, using an adjusted plurality of required active power generations and an adjusted plurality of required reactive power generations as the operating conditions, wherein the adjusted plurality of required active power generations and the adjusted plurality of required reactive power generations are obtained from executing a post-processing (PP) process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

Figure 1:
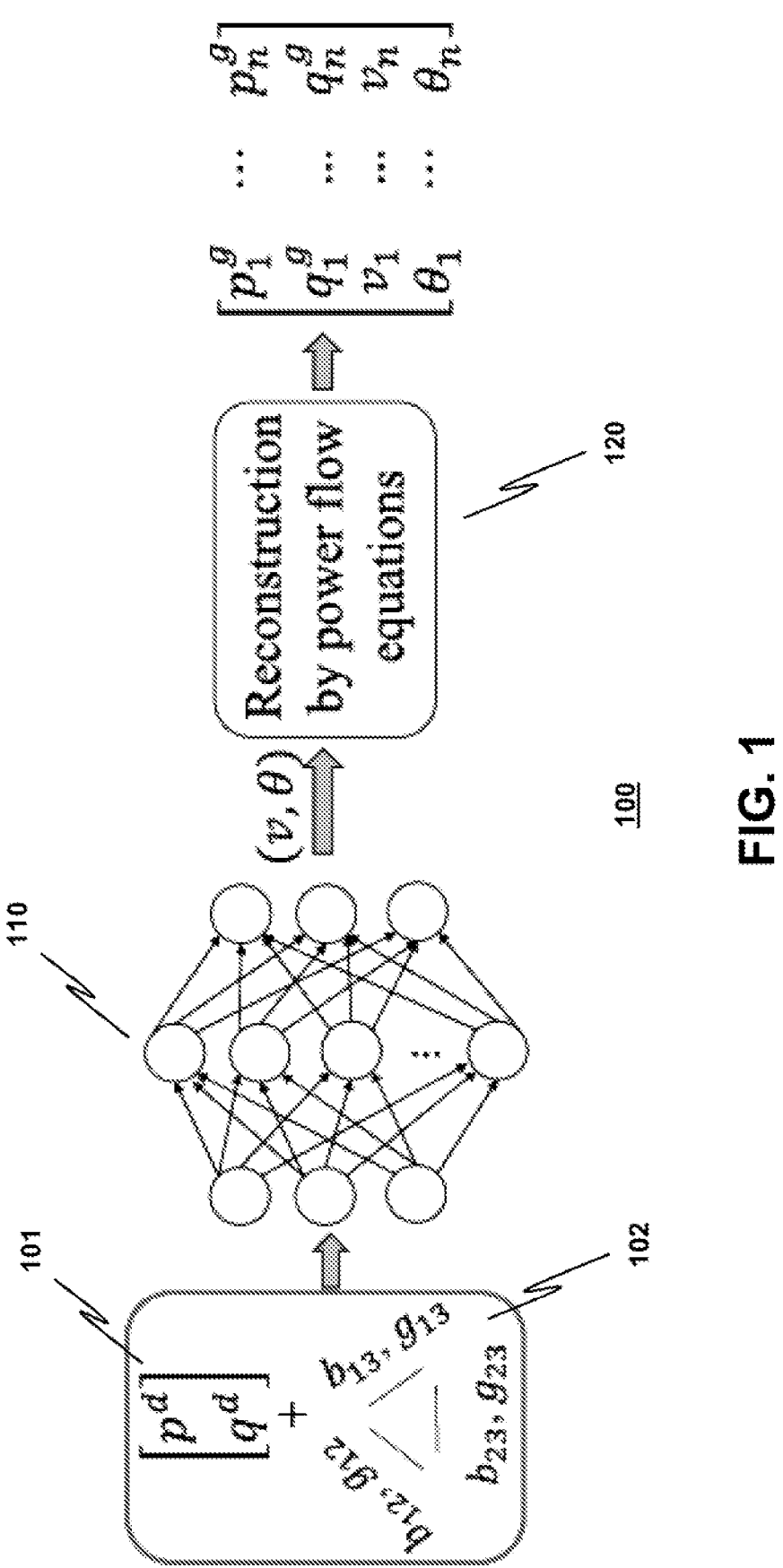
FIG. 1 depicts a schematic diagram of Deep OPF with flexible topology as disclosed herein.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

As used herein, "deep neural network" or "DNN" means an artificial neural network with more than two layers.

As used herein, "active power generation" means real power generated, supplied, or required to be supplied, by a certain electrical power source.

As used herein, "reactive power generation" means reactive power developed, or supplied, by a certain electrical power source.

As used herein, "active load" means real power absorbed or demanded by a certain load.

As used herein, "reactive load" means reactive power experienced or demanded by a certain load.

As used herein, "continuous admittance" means the set of all possible values of conductance and susceptance of the electrical connections that satisfy the power system's power flow equations. The conductance is a measure of the ease with which charge carriers can pass through a branch. The susceptance is a measure of the ability of the branch to store or release electric energy.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," and "including" or any other variation thereof, are to be construed as open-ended terms (i.e., meaning "including, but not limited to,") unless otherwise noted. The use of any and all examples, or exemplary language (e.g., "such as") provided herein, is intended merely to illuminate the invention better and does not pose a limitation on the scope of the invention unless otherwise claimed. No language in the specification should be construed as indicating any non-claimed element as essential to the practice of the invention.

Unless otherwise defined, all terms (including technical and scientific terms) used in the embodiments of the present invention have the same meaning as commonly understood by an ordinary skilled person in the art to which the present invention belongs.

In light of the background, it is desirable to provide a computer-implemented method for determining a single DNN to solve multiple AC electrical power systems with different topologies and line admittances without the necessity of retraining.

A. AC-OPF Problem

The AC-OPF problem is defined for finding an optimal operating condition of an AC electrical power system. The system is modeled as a network of electrical buses interconnected by branches (or called transmission lines), where a certain branch that interconnects two buses is modeled to have an equivalent impedance or admittance that represents an aggregated effect due to cables, transformers, inductors, capacitors, etc., located between the two buses. Some or all of the branches have switches that can be switched on or off based on an operation condition and/or on contingency. The electrical buses include generation buses as the supply and load buses as the demand. The purpose of the system is to transfer electrical power from the generation buses to the load buses. The AC-OPF problems are to determine an optimal setting of the generation buses in supplying electrical power to satisfy the demand in the sense of minimizing the total cost of electricity generation while maintaining the system to be operated within certain operation limits.

Formulation of the AC-OPF problems can be found in various references in the art. The AC-OPF problems for the AC electrical power system can be formulated as:

$$\min \sum_{i \in B} C(p_i^g) \tag{1}$$

$$\text{s.t. } \underline{p_i^g} \le p_i^g \le \overline{p_i^g}, \underline{q_i^g} \le q_i^g \le \overline{q_i^g}, i \in B, \tag{2}$$

$$\underline{v_i} \le v_i \le \overline{v_i}, \ i \in B, \tag{3}$$

$$\underline{\theta_{ij}} \le \theta_{ij} = \theta_i - \theta_j \le \overline{\theta_{ij}}, (i, j) \in L, \tag{4}$$

$$p_{ij}^f = g_{ij}v_i^2 - v_iv_j(g_{ij}\cos\theta_{ij} + b_{ij}\sin\theta_{ij}), (i, j) \in L, \tag{5}$$

$$q_{ij}^f = -b_{ij}v_i^2 - v_iv_j(g_{ij}\sin\theta_{ij} - b_{ij}\cos\theta_{ij}), (i, j) \in L, \tag{6}$$

$$p_i^g - p_i^d = \sum_{(i, j) \in L} p_{ij}^f, i \in B, \tag{7}$$

$$q_i^g - q_i^d = \sum_{(i, j) \in L} q_{ij}^f, i \in B, \tag{8}$$

$$(p_{ij}^f)^2 + (q_{ij}^f)^2 \le (\overline{s_{ij}})^2, (i, j) \in L, \tag{9}$$

where: B and L denote a plurality of buses and a plurality of branches, respectively, in the AC electrical power system; $g_{ij}$ and $b_{ij}$ are a conductance and a susceptance, respectively, of branch (i, j), i.e. a transmission line linking bus i and bus j;

$$p_i^g$$

and $$q_i^g$$

denote an active power generation and a reactive power generation, respectively, flowing from bus i to bus j;

$$p_i^d$$

and $$q_i^d$$

denote an active load and a reactive load at bus i, respectively; $v_i$ and $\theta_i$ denote the voltage magnitude and voltage phase angle at bus i, respectively. The upper bound and the lower bound of a certain variable x are represented by $\overline{x}$ and $\underline{x}$ respectively. A branch flow limit of branch (i, j) is denoted as $\overline{s_{ij}}$, which is an operation limit in operating the system.

$$C(p_i^g)$$

is an operating cost for active power generation $$p_i^g.$$

Turning a branch (i, j) on is equivalent to adjusting the corresponding $b_{ij}$ and $g_{ij}$ from zero to non-zero values. The line admittance $Y_{i,j}$ can be used to embed the system topology with conditions on whether a branch is on or off. By determining the impedance using the conductance $b_{ij}$ as the real part and the susceptance $g_{ij}$ as the imaginary part, the line admittance $Y_{i,j}$ can be calculated as the inverse of the impedance. The continuous admittance space Y is an admittance matrix of a plurality of line admittances $Y_{i,j}$ for describing the electrical connections between the branches in a power system.

Note that the plurality of buses is assigned with a plurality of active loads and a plurality of reactive loads such that bus i is arranged to satisfy the active load $$p_i^d$$

and the reactive load $$q_i^d.$$

The AC-OPF problem aims to minimize the total generation cost in (1) with all constraints satisfied and satisfying the plurality of active loads and the plurality of reactive loads. The Kirchhoff's circuit laws are ensured by (5)-(8), in which the constraints (5) and (6) define the active line flow and the reactive line flow, and equations (7) and (8) form a plurality of equality constraints corresponding to power flow balance in operating the system. The active and reactive power generation limits are enforced by (2). The voltage magnitude limit is ensured by (3). The voltage phase angle limit is restricted by (4). The branch flows limit is restricted by (9).

B. Deep OPF with Flexible Topology

FIG. 1 depicts a schematic diagram of the disclosed Deep OPF with Flexible Topology 100. A DNN 110 is employed to learn the mapping from load inputs ($p^d$ and $q^d$) 101, admittance (Y) 102 to voltage magnitudes v and voltage phase angles θ of all buses. The DNN 110 has a multi-layer feed-forward structure. The rectified linear (ReLU) activation function was used on the hidden layers of the DNN 110. The loss function of the DNN 110 is the total mean square error between the DNN prediction and the ground truth. After training, for each load input ($p^d$ and $q^d$) 101 and admittance (Y) 102, the voltage magnitude v and the voltage phase angles θ can be obtained from the well-trained DNN 110. By using the voltage magnitude v, the voltage phase angles θ, and the load input ($p^d$ and $q^d$), one can reconstruct the active power generation and the reactive power generation, i.e., ($p^g$ and $q^g$), by simple computation using the power flow equations 120, without a need to solve non-linear power flow equations. The Deep OPF with Flexible Topology 100 comprises one DNN 110 to solve multiple OPF equations and constraints of an AC electrical power system with different topologies and line admittances, without the necessity of retraining. Therefore, the method can greatly enhance the efficiency and practicality of using the DNN 110 for OPF problem-solving in modern power systems. The power system is modeled with a plurality of branches interconnecting a plurality of buses and generators each having a pre-determined line capacity. Such a flexible topology setting can model the situation with time-varying line admittances or line switching-based contingency or network reconfiguration.

Here, $$p^g = [p_1^g, \dots, p_n^g]$$

is a plurality of required active power generations in vector form, where $$p_i^g,$$

i∈ B, is an (estimated) active power generation required at bus i; and $$q^g = [q_1^g, \dots, q_n^g]$$

is a plurality of required reactive power generations in vector form, where $$q_i^g,$$

i∈ B, is an (estimated) reactive power generation required at bus i; v=[$v_1, \dots, v_n$] is a plurality of voltage magnitudes of the plurality of buses in vector form; θ=[$θ_1, \dots, θ_n$] is a plurality of voltage phase angles of the plurality of buses in vector form.

The method is a predict-and-construct mechanism, which guarantees in-network power flow equality constraints and reduces the number of variables to be predicted by the DNN 110. Finally, a post-processing (PP) method is applied to further improve the feasibility of the obtained operating conditions.

C. Evaluating Performance

Simulations were conducted on a modified IEEE 9-bus system, a IEEE 57-bus system, and a 2000-bus test system. The summary in Table I indicates the DNN structure, training parameters, and the training/testing dataset sizes of the 3 systems. The dataset for the 57-bus system contains 100,000 samples with a 50-50% training-test split. The dataset for the 9-bus system contains 225,000 samples with a 44-56% training-test split. The dataset for the 2000-bus system contains 72,500 samples with a 80-20% training-test split. Each sample was generated as follows. First, sampling data was sampled randomly for each bus from a uniform distribution of 20% variation around a default load region. Then, the sampling data was fed into the conventional solver to obtain the optimal solutions as the ground truth values. In certain embodiments, the ground truth values can be generated using a primal-dual interior-point method in the MATPOWER Interior Point Solver (MIPS) for generating a close-to-optimal solution to the OPF equations.

TABLE I

| | Parameter settings and Data Split | | | | |
| --- | --- | --- | --- | --- | --- |
| # Bus | DNN Structure | Batch Size | Training Epoch | Learning Rate | # Training/ Test Data |
| 57 | 278/1024/512/256 | 128 | 5350 | 1e−4 | 50K/50K |
| 9 | 42/1024/512/256 | 256 | 2650 | 1e−4 | 100K/125K |
| 2000 | 4060/2048/2048/2048 | 512 | 4500 | 1e−5 | 50K/12.5K |

The DNN 110 used in the Deep OPF with Flexible Topology 100 was designed on the platform of PyTorch, which consisted of fully-connected neural networks with 278, 1024, 512, 256-unit/42, 1024, 512, 256-unit/4060, 2048, 2048, 2048-unit hidden layers for the 57/9/2000-bus systems. The ReLU activation function was used on the hidden layers. The maximum epoch and learning rate were set to 5350/2650/4500 and 1e-4/1e-4/1e-5, respectively. The mini-batch size was set to 128/256/512 for the 57/9/2000-bus systems. Simulation tests were run on the quad-core (i7-3770@3.40G Hz) CPU workstation with 16 GB random access memory.

The performance of the Deep OPF with Flexible Topology 100 is evaluated by the following performance metrics:

1) Optimality Loss: It measures the average relative deviation $η_{opt}$ between the optimal objective value found by MIPS and that by the Deep OPF with Flexible Topology 100.

2) Constraint Satisfaction: It evaluates the feasibility of the generated solutions from two aspects: constraint satisfaction ratio (i.e. the percentage of inequality constraints satisfied) and the degree of violation (i.e. the distance between the violated variable and the boundary). The constraint satisfaction ratios (the degrees of violation) of voltage magnitude, active power generation, reactive power generation, branch power flow, and phase angle difference are denoted by $η_v$, $η_{p^g}$, $η_{q^g}$, $η_{sl}$, and $η_θ$, respectively.

3) Speedup: The speedup factor $η_{sp}$, measures the average ratio of the running time of the MIPS to solve the AC-OPF problems to the running time of the Deep OPF with Flexible Topology 100 to solve the AC-OPF problems. Therefore, this measures the speedup gain.

4) Load Satisfaction Ratio: It is defined as the percentage of demanded loads satisfied. The load satisfaction ratios for the active load and the reactive load are denoted as $\eta_{p^d}$ and $\eta_{q^d}$, respectively.

Advantageously, the training dataset further includes training admittances randomly sampled from a uniform distribution of a predetermined variation around the default admittances. In particular, the training admittances are sampled from a first region between 2% to 120% of the default admittances covering an on status of the plurality of branches, and a second region between −2% to 2% of the default admittances covering an off status of the plurality of branches. The on status and the off status have a probability of 96.7% and 3.3%, respectively. For the testing dataset or the baseline, there are two scenarios for the admittances: (i) fixed admittance where admittances are set as default admittances; and (ii) flexible admittance where admittance are randomly sampled from a uniform distribution of a variation between 80% and 120% around the default admittances. The flexible admittance is intended to capture the slight admittance variation in real power systems.

Simulations were carried out over a modified 57-bus system with 14 configurable lines to show the performance on topology reconfiguration. As baseline comparison, discrete training with fixed admittance (DIS-V1) and flexible admittance (DIS-V2) were used.

TABLE II

| | Simulation results obtained for the 57-bus system. | | | | |
|---|---|---|---|---|---|
| Metric | Deep OPF - Flexible Topology (50,000) | DIS-VI (50,000) | DIS-V2 (50,000) | DIS-V1 (150,000) | DIS-V2 (150,000) |
| $\eta_{opt}$ (%) | 0.14 | −4.29 | −1.31 | −4.79 | 1.07 |
| $\eta_r/\eta_\theta$ (%) | — | — | — | — | — |
| $\eta_{p^g}$ (%) | 95.0 | 94.3 | 93.3 | 97.0 | 96.1 |
| $\eta_{q^g}$ (%) | 96.0 | 92.4 | 95.6 | 96.3 | 94.0 |
| $\eta_{sl}$ (%) | >99.9 | >99.9 | >99.9 | >99.9 | >99.9 |
| $\eta_{p^d}$ (%) | 97.2 | 92.7 | 95.2 | 95.8 | 95.8 |
| $\eta_{q^d}$ (%) | 94.3 | 87.5 | 91.2 | 93.0 | 91.6 |
| $\eta_{sp}$ | X129 | X130 | X132 | X130 | X130 |

The results in Table II indicate that the Deep OPF with Flexible Topology 100 achieves better performance in optimality, feasibility, and load satisfaction than DIS-V1 and DIS-V2 schemes. The DIS-V1 and DIS-V2 schemes need to have 3 times the number of training data in order to achieve a comparable performance.

Figure 2:
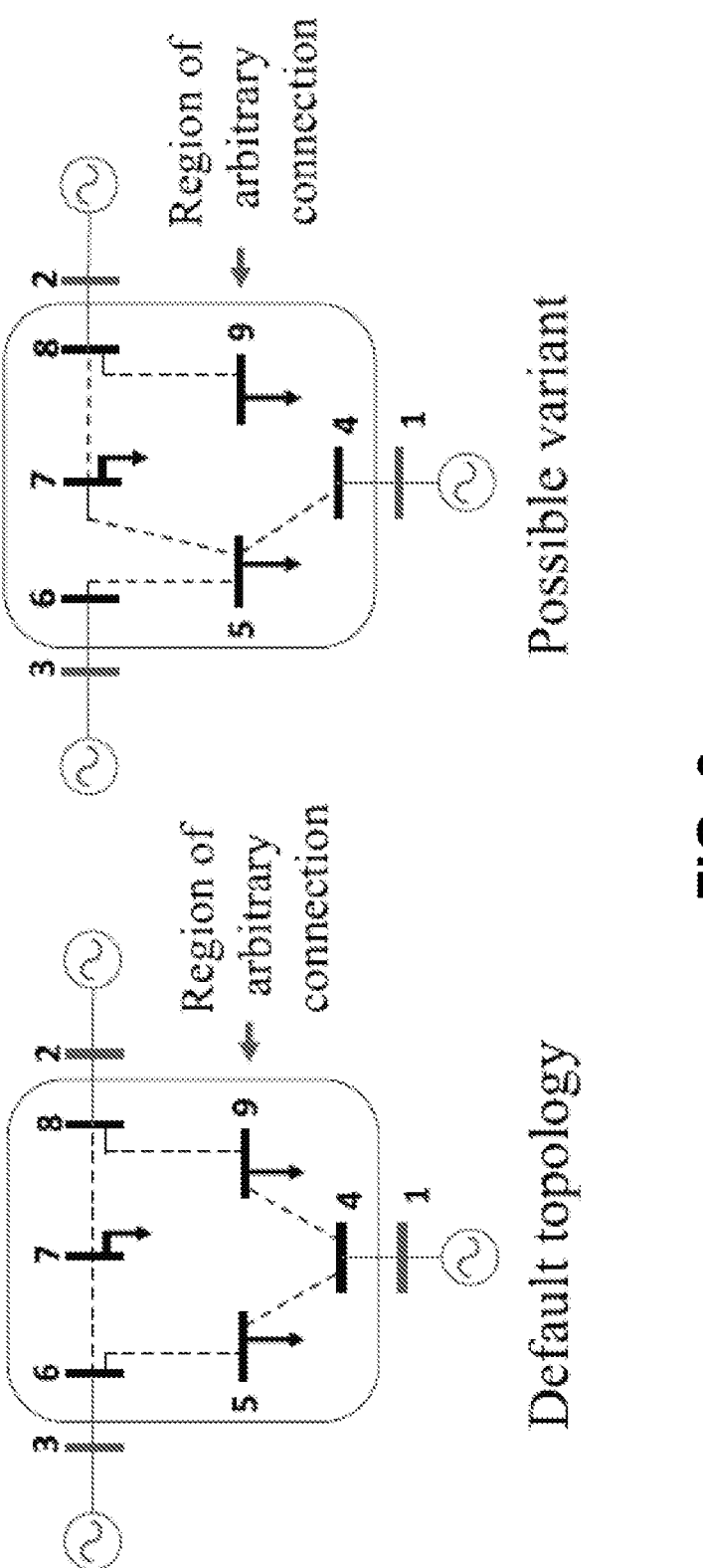
FIG. 2 depicts a possible topology variation in the IEEE 9-bus system.

Simulations were carried out over a modified IEEE 9-bus system to show the performance in solving AC OPF problems over arbitrary topology. As shown in FIG. 2, all 15 lines incident on buses No. 4-9 can be switched on or off. Among the 32,768 possible topologies, 19,647 of them that support the same load region are selected.

TABLE III

| | Simulation results obtained for the 9-bus system. | | | | |
|---|---|---|---|---|---|
| | Deep OPF - Flexible Topology | | DeepOPF-V for single topology | | |
| Metric | (FT, —) | (FT, FA) | (FT, —) | (FT, FA) | (—, —) |
| $\eta_{opt}$ (%) | 0.84 | 0.92 | 94.60 | 95.23 | −0.95 |
| $\eta_r/\eta_\theta$ (%) | — | — | — | — | — |

TABLE III-continued

| | Simulation results obtained for the 9-bus system. | | | | |
|---|---|---|---|---|---|
| | Deep OPF - Flexible Topology | | DeepOPF-V for single topology | | |
| Metric | (FT, —) | (FT, FA) | (FT, —) | (FT, FA) | (—, —) |
| $\eta_{p^g}$ (%) | >99.9 | >99.9 | 53.6 | 53.6 | 100 |
| $\eta_{q^g}$ (%) | >99.9 | 100 | 97.8 | 97.8 | >99.9 |
| $\eta_{sl}$ (%) | >99.9 | >99.9 | 96.6 | 96.3 | 100 |
| $\eta_{p^d}$ (%) | 97.4 | 97.3 | 74.8 | 74.6 | 97.0 |
| $\eta_{q^d}$ (%) | 95.3 | 95.0 | 57.0 | 56.8 | 91.8 |
| $\eta_{sp}$ | X124 | X122 | X88 | X86 | X133 |

The performance of the Deep OPF with Flexible Topology 100 is evaluated over two scenarios: (i) flexible topology but fixed admittances ((FT, −)) and (ii) flexible topology and flexible admittances ((FT, FA)). For comparing the performance, 10 topologies are selected randomly from the 19,647 topologies, to train, and evaluate a DeepOPF-V [2] (as represented by fixed topology and fixed admittance ((−, −))) as the baseline. Table III shows that the Deep OPF with Flexible Topology 100 achieves a much better performance in optimality, feasibility, and load satisfaction over all possible testing topologies. This shows that (i) DNN trained for one topology does not work well over other topologies, and (ii) the effectiveness of the embedded training design of the present disclosure. DeepOPF-V needs 3002 training data to achieve the shown performance for a single topology. This suggests that 300×19647 training data will be needed if we train one DeepOPF-V for every possible topology with comparable performance.

Further simulations were carried out over a modified 2000-bus system to show the scalability of the present disclosure. The Deep OPF with Flexible Topology 100 was tested in default topology (N) and N−1 contingency (N−1). Table IV shows that (i) the Deep OPF with Flexible Topology 100 achieves satisfactory results over the two test scenarios, suggesting the scalability to large test systems; and (ii) DeepOPF-V achieves comparable performance, indicating the insensitivity of OPF solutions to N−1 contingency in the large 2000-bus test system. It is also noted that the Deep OPF with Flexible Topology 100 achieves a lower speedup than DeepOPF-V, as it employs a larger DNN for learning a higher dimensional mapping in its design.

TABLE IV

| | Simulation results obtained for the 2000-bus system. | | | |
|---|---|---|---|---|
| | Deep OPF - Flexible Topology | | DeepOPF-V for single topology | |
| Metric | N | N-1 | N | N-1 |
| $\eta_{opt}$ (%) | 0.02 | 0.11 | 0.28 | 0.27 |
| $\eta_r/\eta_\theta$ (%) | — | — | — | — |
| $\eta_{p^g}$ (%) | >99.9 | >99.9 | >99.9 | >99.9 |
| $\eta_{q^g}$ (%) | 99.9 | 99.8 | 99.9 | 99.9 |
| $\eta_{sl}$ (%) | >99.9 | >99.9 | >99.9 | >99.9 |
| $\eta_{p^d}$ (%) | 99.9 | 99.8 | 99.4 | 99.4 |
| $\eta_{q^d}$ (%) | 95.9 | 95.5 | 96.1 | 96.1 |
| $\eta_{sp}$ | X7646 | X7743 | X16335 | X16083 |

D. Post-Processing Method

The feasibility of the solution predicted by the Deep OPF with Flexible Topology 100 is examined if the solution violates any one of the constraints. In general, not all solutions are feasible.

In certain embodiments, a PP method is developed herein to improve the feasibility of the predicted solution at an operating point $(\hat{v}, \hat{\theta})$. The PP method has two steps. First, the constraints in (5)-(8) are checked. Second, if there is a violation, the related voltage magnitudes v and voltage phase angles $\theta$ are adjusted as:

$$v_{PP} = \hat{v} + \Delta v, \; \theta_{PP} = \hat{\theta} + \Delta\theta \qquad (10)$$

where $\Delta v$ and $\Delta\theta$ are obtained as follows.

Denote constraints in (5)-(8) in a compact form as $\underline{f} \leq f(\theta, v) \leq \bar{f}$. For each constraint $f_i(\theta, v)$, define $\Delta f_i = \max(f_i(\theta, v) - \bar{f}_i, 0) + \min(f_i(\theta, v) - \underline{f}_i, 0)$. Linearizing $\Delta f$ around the operating point $(\hat{v}, \hat{\theta})$ gives $$\begin{bmatrix} \Delta\theta \\ \Delta v \end{bmatrix} = F_{\theta v}^{+} \Delta f, \; F_{\theta v} = \begin{bmatrix} \dfrac{\partial f}{\partial \theta} & \dfrac{\partial f}{\partial v} \end{bmatrix}, \qquad (11)$$

where $$F_{\theta v}^{+}$$

is the pseudo-inverse of $F_{\theta v}$.

Since voltages do not change a lot in normal operations, $F_{\theta v}$ may be approximated by a constant $$F_{\theta v}^{his}$$

calculated at an average historical operating point $(v^{his}, \theta^{his})$ to reduce the computational burden, viz.

$$F_{\theta v} \approx F_{\theta v}^{his}. \qquad (12)$$

Using (11), the values of $\Delta\theta$ and $\Delta V$ are adjusted adaptively according to $\Delta f$. Note that this method helps to improve but cannot guarantee the satisfaction of the constraints. To guarantee voltage constraints are satisfied, $\hat{v}_{pp}$ are kept within the limits after adjustment.

Conventionally, post-processing the predicted solution to improve feasibility usually involves a computationally intensive algorithm. A main advantage of the PP method as disclosed herein is that this method is fast due to using linear adjustment as set forth in (10) and (11).

E. Disclosed Method

A computer-implemented method for solving OPF equations and constraints of an AC electrical power system with plural topologies and admittances is developed as follows according to the Deep OPF with Flexible Topology 100 as disclosed above. The AC electrical power system is modeled with a plurality of branches interconnecting a plurality of buses and generators each having a pre-determined line capacity. The plurality of buses is assigned with load inputs of a plurality of active loads $$p_i^d$$

and a plurality of reactive loads $$q_i^d$$

such that an individual bus is arranged to satisfy a respective active load and a respective reactive load.

Figure 3:
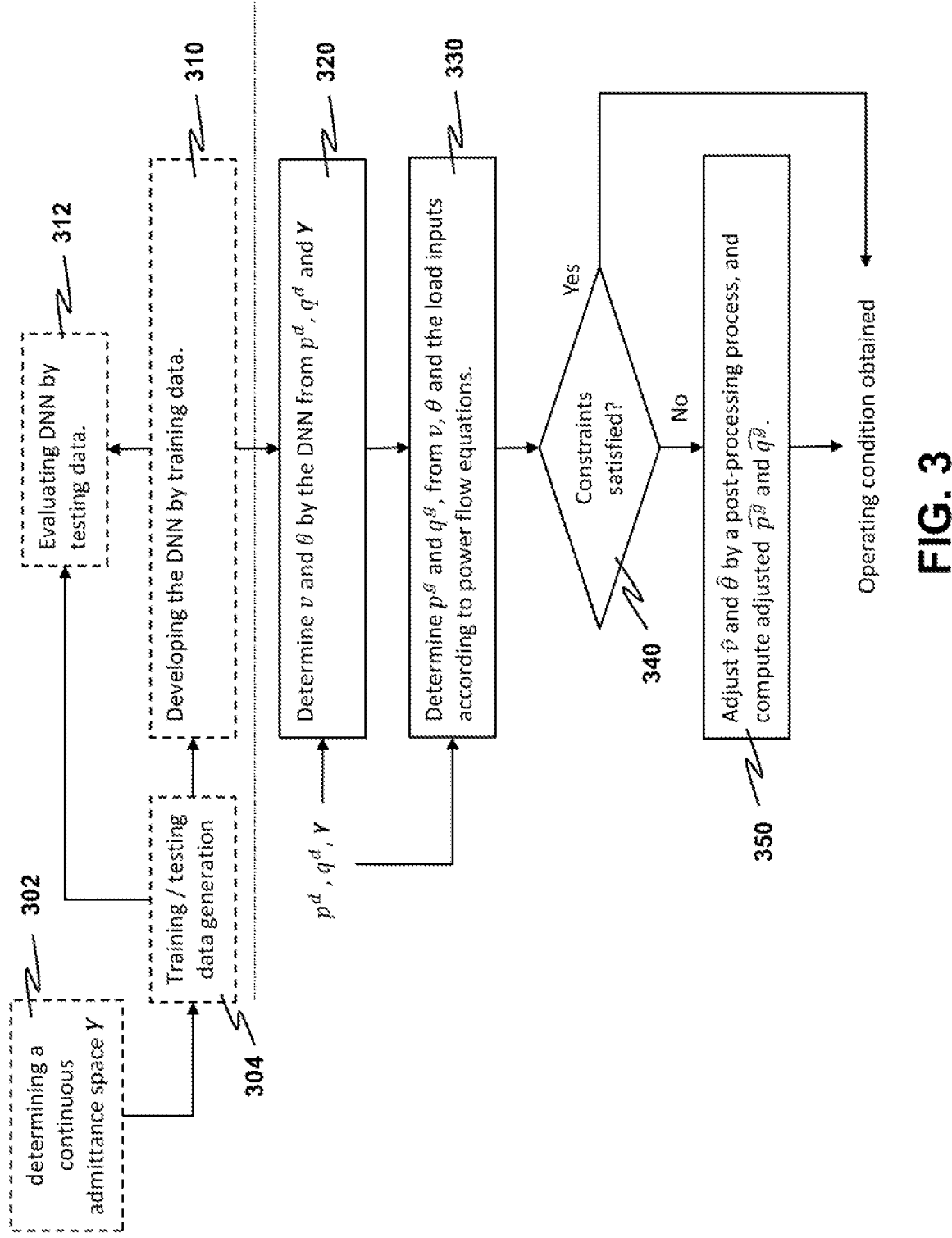
FIG. 3 depicts a flowchart showing exemplary steps of a computer-implemented method as disclosed herein for determining an operating condition of an AC electrical power system, where the disclosed method is developed based on Deep OPF with flexible topology in determining the operating condition.

The method is illustrated with the aid of FIG. 3, which depicts a flowchart showing exemplary steps of the disclosed method.

The objective of the DNN 110 is to solve multiple AC-OPF problems with flexible topologies and line admittances. Therefore, the present disclosure provides a method to embed the discrete topology representation into a continuous admittance space for training the DNN 110. The representation shall cover all possible topologies with the same bus, generation, and line capacity configurations. In step 302, the method comprises the step of determining a continuous admittance space Y to embed the plural topologies. The continuous admittance space Y is an admittance matrix of a plurality of line admittances $Y_{i,j}$ each having a default admittance computed using a conductance $b_{ij}$ and a susceptance $g_{ij}$ of the plurality of branches. Particularly, the admittance is a complex number representing the total ability of a branch to pass AC current. It is the sum of the conductance $b_{ij}$ and susceptance $g_{ij}$ of the branch, wherein the conductance $b_{ij}$ is the real part of the admittance; and the susceptance $g_{ij}$ is the imaginary part of the admittance.

In step 304, the training data and testing data are generated for the purpose of training the DNN 110 and evaluating the DNN 110. The DNN 110 is trained using the load input 101 and the admittances (Y) 102. More specifically, the method comprises uniformly sampling from a load region at random for selected data points, then labeling the selected data points with labels and ground truth values of the plurality of voltage magnitudes v and the plurality of voltage phase angles $\theta$. The ground truth values can be generated using a primal-dual interior-point method in the MIPS for generating a close-to-optimal solution to the OPF equations. Therefore, the DNN 110 can learn the mapping from the load input 101 and the admittances (Y) 102 to the MIPS solutions. After the selected data points are labeled, the selected data points are split into a first group of load inputs for the training dataset and a second group of load inputs for the testing dataset. As disclosed above, the training dataset is used for training the DNN 110, and the testing dataset is used for evaluating the performance of the DNN 110.

In certain embodiments, the step of uniformly sampling from the load region at random for selected data points comprises uniformly sampling the load region at random in a range of 80% to 120% of the default value in the training dataset and the testing dataset.

In the training dataset, the admittances (Y) 102 are also sampled. The method comprises uniformly sampling from the default admittances at random for training admittances in a first region covering an on status of the plurality of branches and a second region covering an off status of the plurality of branches. In particular, the first region is defined as a range between 2% to 120% of the default admittances for covering the on status of the plurality of branches; and the second region is defined as a range between −2% to 2% of the default admittances for covering the off status of the plurality of branches. The training admittances obtained from above are used as the training dataset.

In step 310, it is intended to provide a method for developing the DNN 110 for solving OPF equations and constraints of an AC electrical power system with plural topologies and admittances. The method comprises the step of training the DNN 110 with training dataset before using the DNN 110 to compute the plurality of voltage magnitudes v and the plurality of voltage phase angles θ; and evaluating the DNN 110 with testing dataset on performance metrics based on a flexible topology with fixed admittances scenario, and a flexible topology with flexible admittances scenario. In certain embodiments, the performance metrics include optimality loss, constraint satisfaction, speedup, and load satisfaction. After training, for each load input ($p^d$ and $q^d$) 101 and admittance (Y) 102, the voltage magnitude v and the voltage phase angles θ can be obtained from the well-trained DNN 110.

Step 312 provides the method for evaluating the DNN 110. The testing dataset for evaluating the DNN 110 are based on a flexible topology with fixed admittances scenario, and a flexible topology with flexible admittances scenario. The flexible topology with fixed admittances scenario applies the default admittances for evaluating the DNN 110. The flexible topology with flexible admittances scenario applies a flexible admittance for evaluating the DNN 110. The flexible admittance in the latter scenario is randomly sampled from a uniform distribution of a predetermined variation around the default admittances for capturing a variation of the admittance in a real power system. In certain embodiments, the predetermined variation is 20% such that the flexible admittance is sampled between 80% to 120% of the default admittances.

With the trained DNN 110, Step 320 is intended to receive the load inputs ($p^d$ and $q^d$) 101 and the admittance (Y) 102 as inputs, and to determine the plurality of voltage magnitudes v and the plurality of voltage phase angles θ of the plurality of buses such that a complex-valued voltage observed at the individual bus is predicted. Advantageously, the plurality of voltage magnitudes v and the plurality of voltage phase angles θ are computed by the single DNN 110.

The next step 330 provides the method for determining an active power generation $p^g$ and a reactive power generation $q^g$, comprising reconstructing an active power generation $p^g$ and a reactive power generation $q^g$ using power flow equations according to the plurality of voltage magnitudes v, the plurality of voltage phase angles θ, and the load inputs. In particular, the plurality of required active power generations and the plurality of required reactive power generations for the plurality of buses are determined to minimize the total cost of power generation formulated by (1). Therefore, a plurality of required active power generations and a plurality of required reactive power generations for the plurality of buses are obtained.

Step 340 and step 350 are the post-processing process to further improve the feasibility of the obtained operating conditions. The constraints are checked to determine if they are satisfied. If the plurality of constraints is satisfied by the plurality of required active power generations and the plurality of required reactive power generations, then the plurality of required active power generations and the plurality of required reactive power generations are used as the operating conditions.

If the plurality of constraints is not satisfied by the plurality of required active power generations and the plurality of required reactive power generations, an adjusted plurality of required active power generations and an adjusted plurality of required reactive power generations are used as the operating conditions. The adjusted plurality of required active power generations and the adjusted plurality of required reactive power generations are obtained from executing a PP process.

This illustrates a Deep OPF Flexible Topology as an embedded training approach in accordance with the present disclosure. The training approach enables the training of a single DNN to solve multiple AC-OPF problems with different topologies and line admittances without the necessity of retraining. It will be apparent that variants of the above-disclosed and other features and functions, or alternatives thereof, may be integrated into various power generation systems. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

REFERENCES

The following references are cited in the specification. Disclosures of these references are incorporated herein by reference in their entirety.

[1] M. Zhou, M. Chen and S. H. Low, "DeepOPF-FT: One Deep Neural Network for Multiple AC-OPF Problems with Flexible Topology", IEEE Transactions on Power Systems. vol. 38, no. 1, pp. 964-967, January 2023. DOI: 10.1109/TPWRS.2022.3217407.

[2] W. Huang, X. Pan, M. Chen, and S. H. Low, "DeepOPF-V: Solving AC-OPF problems efficiently," IEEE Trans. Power Syst., vol. 37, no. 1, pp. 800-803, January 2021.

[3] M. Chen, W Huang, X. Pan, "Deep learning-based optimal power flow solution with applications to operating electrical power systems," patent application No. U.S. Ser. No. 17/448,537, Publication No. US 2023/0085739 A1.

[4] S. Liu, C. Wu, and H. Zhu, "Topology-aware graph neural networks for learning feasible and adaptive AC-OPF solutions," 2022, arXiv:2205.10129.

What is claimed is:

1. A computer-implemented method for solving multiple optimal power flow (OPF) equations of an alternating-current (AC) electrical power system under a plurality of constraints with plural topologies and admittances, the AC electrical power system being modeled with a plurality of branches interconnecting a plurality of buses and generators each having a pre-determined line capacity, the plurality of buses being assigned with load inputs of a plurality of active loads $$p_i^d$$

and a plurality of reactive loads $$q_i^d$$

such that an individual bus is arranged to satisfy a respective active load and a respective reactive load, the method comprising:

determining a continuous admittance space Y to embed the plural topologies, wherein the continuous admittance space Y is an admittance matrix of a plurality of line admittances $Y_{i,j}$ each having a default admittance computed using a conductance $b_{ij}$ and a susceptance $g_{ij}$ of the plurality of branches;

determining a plurality of voltage magnitudes v and a plurality of voltage phase angles θ of the plurality of buses such that a complex-valued voltage observed at the individual bus is predicted, wherein the plurality of voltage magnitudes v and the plurality of voltage phase angles θ are computed by a deep neural network (DNN), and wherein the DNN receives the load inputs and the plurality of line admittances $Y_{i,j}$ as inputs;

reconstructing an active power generation $p^g$ and a reactive power generation $q^g$ using power flow equations according to the plurality of voltage magnitudes v, the plurality of voltage phase angles θ, and the load inputs, whereby a plurality of required active power generations and a plurality of required reactive power generations for the plurality of buses are obtained; and training the DNN with a training dataset before using the DNN to compute the plurality of voltage magnitudes v and the plurality of voltage phase angles θ, wherein the training dataset includes a plurality of training admittances used as the plurality of line admittances in training the DNN, an individual training admittance being associated with a corresponding line admittance, the individual training admittance being randomly and uniformly sampled from a region of −2% to 120% of the default admittance of the corresponding line admittance such that the individual training admittance covers both on and off statuses of the corresponding line admittance to thereby enable the DNN to be used for solving the multiple OPF equations under the plurality of constraints with the plural topologies and admittances without a need to retrain the DNN.

2. The method of claim 1 further comprising:

evaluating the DNN with testing dataset on performance metrics based on a flexible topology with fixed admittances scenario, and a flexible topology with flexible admittances scenario.

3. The method of claim 2 further comprising:

randomly sampling data points from a uniform distribution of a predetermined variation around a default load region;

labeling the data points with labels and ground truth values of the plurality of voltage magnitudes v and the plurality of voltage phase angles θ; and splitting the data points into a first group of load inputs for the training dataset and a second group of load inputs for the testing dataset.

4. The method of claim 3, wherein the ground truth values are generated using a primal-dual interior-point method to solve an individual OPF problem of the multiple OPF equations for generating a close-to-optimal solution to the individual OPF equations.

5. The method of claim 2, wherein the flexible topology with fixed admittances scenario applies the default admittances for evaluating the DNN; and the flexible topology with flexible admittances scenario applies a flexible admittance for evaluating the DNN; and wherein the flexible admittance is randomly sampled from a uniform distribution of a predetermined variation around the default admittances for capturing a variation of the admittance in a real power system.

6. The method of claim 5, wherein the predetermined variation is 20% such that the flexible admittance is sampled between 80% to 120% of the default admittances.

7. The method of claim 1, wherein the plurality of required active power generations and the plurality of required reactive power generations for the plurality of buses are determined to minimize a total cost of power generation formulated by:

$$\min \sum\nolimits_{i \in B} C(p_i^g).$$

8. The method of claim 1 further comprising:

if the plurality of constraints is satisfied by the plurality of required active power generations and the plurality of required reactive power generations, using the plurality of required active power generations and the plurality of required reactive power generations as operating conditions.

9. The method of claim 8 further comprising:

if the plurality of constraints is not satisfied by the plurality of required active power generations and the plurality of required reactive power generations, using an adjusted plurality of required active power generations and an adjusted plurality of required reactive power generations as the operating conditions, wherein the adjusted plurality of required active power generations and the adjusted plurality of required reactive power generations are obtained from executing a post-processing (PP) process.

* * * * *